United States Patent
Wood et al.

(10) Patent No.: US 7,040,715 B2
(45) Date of Patent: May 9, 2006

(54) DIGITAL MULTI-POINT ELECTRONIC LOAD WEIGH SYSTEM

(75) Inventors: James A. Wood, Spartanburg, SC (US); Richard J. Mazur, Spartanburg, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 34 days.

(21) Appl. No.: 10/984,620

(22) Filed: Nov. 9, 2004

(65) Prior Publication Data

US 2005/0082906 A1 Apr. 21, 2005

Related U.S. Application Data

(62) Division of application No. 10/338,296, filed on Jan. 8, 2003, now Pat. No. 6,820,944.

(51) Int. Cl.
*B60T 13/74* (2006.01)
*B60T 8/18* (2006.01)

(52) U.S. Cl. .............................. 303/3; 303/7; 303/22.5; 303/22.6

(58) Field of Classification Search .................... 303/3, 303/7, 8, 9, 9.69, 128, 22.1, 22.2, 22.3, 22.5, 303/22.6
See application file for complete search history.

(56) References Cited

U.S. PATENT DOCUMENTS

| | | | |
|---|---|---|---|
| 5,662,389 A * | 9/1997 | Truglio et al. | 303/7 |
| 5,788,339 A | 8/1998 | Wood et al. | |
| 5,887,953 A | 3/1999 | Wood et al. | |
| 6,120,109 A | 9/2000 | Wood et al. | |
| 6,126,247 A * | 10/2000 | Paul et al. | 303/7 |
| 6,435,623 B1 | 8/2002 | Peltz | |
| 6,561,595 B1 | 5/2003 | Vaughn | |
| 6,839,664 B1 * | 1/2005 | Kull | 303/7 |

FOREIGN PATENT DOCUMENTS

EP 958 980 A2 11/1999

* cited by examiner

*Primary Examiner*—Thomas Williams
(74) *Attorney, Agent, or Firm*—The Webb Law Firm

(57) ABSTRACT

A digital multi-point electronic load weigh system is used with a railcar truck control unit to provide a digital all electrical/electronic system, which will perform the brake load weigh function for an electro-pneumatic brake system. The digital multi-point electronic load weigh system is primarily to be used with a distributed electronic control system using neuron style communication/control microprocessors. However, the digital multi-point electronic load weigh system can also be integrated with existing electro-pneumatic brake control components.

12 Claims, 4 Drawing Sheets

DIGITAL MULTI-POINT ELECTRONIC LOAD WEIGH SYSTEM

CROSS REFERENCE TO RELATED APPLICATIONS

This application is related to U.S. Pat. No. 6,120,109 entitled Universal Pneumatic Brake Control Unit, which is assigned to the assignee of the present invention described and its teachings are incorporated herein by reference thereto. This application is also a division of parent application Ser. No. 10/338,296 filed Jan. 8. 2003, now U.S. Pat. No. 6,820,944.

FIELD OF THE INVENTION

The invention generally relates to a system for controlling the brakes of a railcar. More particularly, the invention pertains to a brake control unit capable of being used with many different types of electropneumatic brake control systems for controlling the brakes on one or more trucks of a railcar. Still more particularly, the invention pertains to a device that electronically compensates for the weight of the load borne by a railcar truck in formulating the braking effort to be applied to the wheels of that truck.

BACKGROUND OF THE INVENTION

A typical passenger transit or subway type train includes a locomotive, a plurality of railcars and several trainlines. The trainlines include both pneumatic and electrical lines most of which run from the locomotive to the last railcar in the train. The main reservoir equalization (MRE) pipe is one such pneumatic trainline. It consists of a series of individual pipe lengths. Secured to the underside of each railcar, one such pipe length connects via a coupler to another such pipe length secured to a neighboring railcar. The MRE pipe is thus essentially one long continuous pipe that runs from the locomotive to the last railcar. Charged by air compressors, which may be located throughout the train, it is the MRE pipe that serves to supply air to the various reservoirs, such as the supply reservoir, located on each railcar in the train.

One pneumatic trainline of particular importance to passenger transit and subway type trains is the brake pipe. It is used to convey to each railcar in the train an emergency brake signal when an emergency condition arises. Of similar importance is the brake control trainline that is used to carry the brake command to each railcar in the train as discussed below. Contained within a protective conduit along with other electrical trainlines, the brake control trainline is similarly formed from individual conduits connected in series.

A locomotive for a passenger transit or a subway type train typically has an electropneumatic brake control system such as the RT-5 Brake Control System produced by the Westinghouse Air Brake Technology Company (WABTEC). Adapted or configured to fit the needs of various passenger transit authorities, each of the RT-5 style systems currently in service feature a master controller by which a train operator can direct the overall braking and propulsive efforts for the entire train.

The master controller in the locomotive houses a handle, a computer and various other related components. The handle can be moved longitudinally anywhere along its range of motion and into any one of several designated positions. By moving the handle into the appropriate position, a train operator can initiate, maintain or halt braking or propulsion of the train. For example, from a position in which the train is currently being propelled, moving the handle to what is referred to as the full service position causes a service application of the brakes. Similarly, when moved to the emergency position, the operator can initiate an even faster type of braking referred to as an emergency application of the brakes. There are other positions for the handle whose purposes are beyond the scope of the present invention described and claimed below.

Based on the positions of the handle, the computer of the master controller can ascertain whether, and to what degree, the overall braking or propulsive effort of the train should be reduced or increased. A keyboard may also be used to permit the operator greater access to the brake equipment, allowing, for example, input of set-up parameters. Other known components may also be used to provide various other signals to the computer.

Based on the inputs it receives and the software that dictates its operation, the master controller essentially controls the overall operation of the brakes. For service braking, the master controller formulates the brake command appropriate to current conditions and conveys it along the brake control trainline to each of the railcars in the train. Through its brake command, the master controller can order any action from a release of brakes to a service application of the brakes or any degree of brake application in between those two extremes.

For emergency braking, a push-button type emergency valve in the locomotive can be used to affect a drop in brake pipe pressure to an emergency level using both pneumatic and electrical means simultaneously. When push-actuated, the emergency valve provides a path for the brake pipe to vent directly to atmosphere. It also simultaneously deenergizes an emergency trainline thereby deenergizing one or more emergency magnet valves to further vent the brake pipe.

Alternatively, when directed by the master controller, an emergency brake control valve on the locomotive could be used to decrease brake pipe pressure to the emergency level. By reducing the brake pipe pressure to the emergency level, whether initiated from the locomotive or from any other point in the train, this sends an emergency brake signal along the brake pipe to all other railcars in the train.

On passenger transit and subway-type trains, the brake pipe is typically operated according to a binary logic scheme. Normal operating pressure for the brake pipe during non-emergency situations ranges from 130 to 150 psi, the pressure to which it is charged via the MRE pipe. The transition point, or emergency level, lies at approximately 90 psi. A pressure of 90 psi or below indicates an emergency. It is this lower pressure range that constitutes the emergency brake signal.

Each passenger transit railcar typically includes an electronic controller and two trucks, with each truck typically having two axles. In response to the brake command received from the master controller in the locomotive, the electronic controller controls the operation of both trucks on the railcar. The electronic controller, however, has two central processing units (CPUs). Along with its associated interface equipment, each CPU controls the brake equipment of one truck independently of the other truck. It does so based on the brake command and various other inputs specific to the truck that it controls.

The brake equipment for a truck includes a pneumatic control unit and one or more pneumatically operated brake cylinders. Shown in FIG. 1, the pneumatic control unit typically houses an application magnet valve (AMV), a release magnet valve (RMV), a relay valve, an emergency transfer valve (ETV), a variable load valve (VLV) and an air spring pressure transducer. Used to convert the pressure received from a load sensing system on the truck, the air spring transducer provides a feedback signal indicative of the load borne by the truck.

The relay valve typically takes the form of a J-1 relay valve or similar type valve. It is an air piloted device whose construction and operation are well known in the brake control art. It features a control port connected to the ETV, a supply port supplied by the supply reservoir, an output port from which air can be directed from the supply reservoir to the brake cylinder(s), and an exhaust port from which to vent the brake cylinder(s) to atmosphere. The pressure of the air impinging upon its control port and the pressure of the air that the relay valve delivers to the brake cylinders will be approximately equal, though the air delivered by the latter will be in much greater quantity than that received by the former.

During non-emergency operation of the pneumatic control unit (i.e., when brake pipe pressure lies above the transition point), the ETV assumes an access state in which it connects the control port to both the AMV and RMV. The AMV when opened then allows air from the supply reservoir via the VLV to reach the control port. The RMV when opened allows whatever pressure that impinges on the control port to be vented to atmosphere.

By selectively controlling the opening and closing of the AMV and RMV when the ETV is switched to the access state, the electronic controller can control the magnitude of the pressure received by the control port. A brake cylinder control transducer, also a part of the pneumatic control unit, converts the pressure at the control port to yet another feedback signal. Along with other signals such as those relating to speed, dynamic braking, wheel slip, the air spring feedback and others, this feedback signal is conveyed to the electronic controller to aid it in controlling each pneumatic control unit independently.

The electronic controller acts upon the brake command that it receives from the master controller in the locomotive. Specifically, during service braking, each CPU formulates the exact amount of braking effort appropriate for its truck. It does this by processing the brake command and the aforementioned other signals according to a brake control process whose specifics are beyond the scope of the present invention described and claimed below. Operating in what can be referred to as a service braking mode when its ETV is switched to the access state, the pneumatic control unit has its AMV and RMV magnet valves controlled by their corresponding CPU; each magnet valve being energizable by the CPU with a field effect transistor (FET). By such control of the AMV and RMV magnet valves, the CPU can control the flow of air from the supply reservoir via the VLV and the AMV and RMV magnet valves to the control port via the ETV. This produces at the control port of the relay valve a low capacity pressure corresponding to the amount of braking effort formulated for that particular truck.

The pneumatic control unit operates in what can be referred to as an emergency braking mode when its ETV is switched to the bypass state. Specifically, in an emergency, the ETV responds to the emergency brake signal by pneumatically switching itself to the bypass state in which the AMV and RMV are cutoff from the control port. Air from the supply reservoir is then allowed to flow via the VLV through the ETV directly to the control port. Built at the control port of the relay valve in this manner is a low capacity pressure capable of initiating an emergency application of the brakes on the truck.

In response to whatever low capacity pressure is impinging on its control port, the relay valve provides to the brake cylinder(s) a corresponding pressure of high capacity. This compels the brake cylinder(s) to apply the brakes on the truck. The magnitude of the braking force applied to the wheels is directly proportional to the pressure built up in the brake cylinder(s).

It is also well known that the braking effort sought to be applied to wheels of a truck is often formulated to take into account the weight of the load borne by the truck through a process generally known as load compensation.

The variable load valve (such as that described in Operation & Maintenance Publication 4229-1 published by WABTEC) is an air piloted device whose construction and operation are well known in the brake control art. The magnitude of the air spring pressure is indicative of the load that the truck is currently carrying. The VLV is designed to limit the maximum pressure at which air from the supply reservoir is directed to the control port of the relay valve. This maximum control pressure level is proportional to the pressure that the VLV receives from the air springs. For any particular level of air spring pressure, the VLV determines the maximum allowable pressure that will be supplied to the control port of the relay valve in an emergency.

Regarding the combined operation of the VLV and the relay valve, when the pneumatic control unit operates in the emergency braking mode, its ETV is in the bypass state thereby bypassing the AMV and RMV valves and allowing air to flow from the VLV directly to the control port. The control port thus receives the maximum allowable pressure (i.e., emergency brake control pressure) that the VLV can provide based on the load that the truck is currently carrying. The VLV is essentially set so that the emergency brake control pressure for an empty railcar is X psi and, for a fully loaded railcar, it is (X+Y) psi. Though the emergency brake control pressure can vary from X to (X+Y) psi depending on the load borne by the railcar at any given time, it will never decrease below X or increase beyond (X+Y).

The relay valve responds to the emergency brake control pressure by pressurizing the brake cylinder(s) to an emergency pressure level, a level determined by the setting of the VLV. When operating in the service braking mode with its ETV in the access state, the pneumatic control unit has its AMV and RMV valves controlled by their corresponding CPU. By manipulating the AMV and RMV valves according to aforementioned brake control process, the CPU produces at the control port a lower capacity pressure (i.e., a service brake control pressure) corresponding to the amount of braking effort formulated for that particular truck. The magnitude of the service brake control pressure is determined by the CPU according to the aforementioned brake control process. The relay valve responds to the service brake control pressure by pressurizing the brake cylinder(s) to a service pressure level, a level determined by the CPU and one that will never exceed the emergency brake control pressure setting of the VLV. In this manner, the VLV allows the truck to be braked at a relatively constant rate under fluctuating passenger loads.

The variable load valve has certain disadvantages when compared to the present invention. First, the VLV is inherently compromised in its reliability due to its purely mechanical nature. It is a device that necessarily requires many parts, properly assembled and maintained, to perform its intended function, each part being subject to mechanical wear and tear. Second, the VLV occupies a comparatively large amount of space in, and adds weight to, the system into which it is incorporated. The pneumatic piping that is necessary to connect the VLV to and from the pneumatic components in the system in which it is employed also occupies space in, and adds weight to, the system. Weight and space are two especially important factors in the rail industry where the costs of fuel and the capability to transport cargo or passengers affect the viability of railroad and passenger transit authorities alike.

SUMMARY OF THE INVENTION

The present invention provides a digital multi-point electronic load weigh system for performing a brake load weigh function on a truck of a rail vehicle. Included in the system is a source of fluid pressure to be used for applying pressure to the brake on a truck of a rail vehicle. There is an air spring pressure means disposed on a truck of a rail vehicle for receiving a plurality of predetermined air spring pressure limits from a predetermined plurality of air springs pressure switches. A brake cylinder control means is used for receiving the plurality of predetermined air spring pressure limits for determining an emergency braking condition exists, and generating a brake limit condition signal. There is a network communication and valve control means for receiving the brake limit condition signal, for communicating a voltage signal to a common leg of the air spring pressure means in response to the brake limit condition signal, and for generating an energization signal. Also included is an application valve for receiving the energization signal and for communicating a brake control pressure signal when energized. There is a relay valve for receiving the brake control pressure signal. The relay valve has a supply port connected to the source of fluid pressure, an output port connected to a brake cylinder of a truck, a control port for communicating the source of fluid pressure, and an exhaust port from which to vent such brake cylinder. The relay valve provides, in response to the brake control pressure at its control port, a corresponding pressure to such brake cylinder thereby causing an application of such brakes on such truck. Also included is a release valve for exhausting pressure received from the control port of the relay valve when the release valve is open. A brake control means for converting pressure received from a load sensing system to a feedback signal indicative of a load borne by such truck. There is also a means for granting a load compensation means exclusive control over the application and release valves such that the granting means responds to an indication of an emergency by disconnecting such controller unit from the application and release valves thereby giving the load compensation means exclusive control of the application and release valves whereby said load compensation means compensates for such load borne by such truck during emergency braking, and the granting means responds to an indication of a non-emergency by connecting such controller unit to the application and release valves by which such service braking on such truck is normally controlled with the load compensation means still enabled to compensate for such load borne by such truck during such service braking. The present invention also provides a method for performing a brake load weigh function on a truck of a rail vehicle. The method includes reading a network data packet from a sensor input means for determining a braking requirement. Upon determining if the braking requirement is an emergency brake condition it generates either a yes signal or a no signal indicative of the emergency brake condition. The method communicates the no signal to either a service brake or brake release means, and the yes signal to a means to determine an energization pattern. Finally the method determines an energization pattern.

OBJECTIVES OF THE INVENTION

It is, therefore, a primary object of the present invention to provide a device that electronically compensates for the load borne by a railcar truck in formulating the braking effort to be applied to the wheels of that truck during an emergency. Another object of the present invention is to provide an electronic brake load weigh device for use with a truck control unit of a railcar to enable the truck control unit to compensate for the load borne by the truck during braking operations. Yet another object of the present invention is to provide an electronic brake load weigh device that is far more reliable, smaller in size, lighter in weight, less likely to need maintenance and less costly than prior art mechanical apparatus used to perform the brake load weigh function on a truck of a railcar. In addition to the objects and advantages listed above, various other objects and advantages of the present invention will become more readily apparent to persons skilled in the relevant art from a reading of the detailed description section of this document, particularly when the detailed description is considered along with the following drawing figures and appended claims.

DETAILED DESCRIPTION OF THE INVENTION

Figure 1:
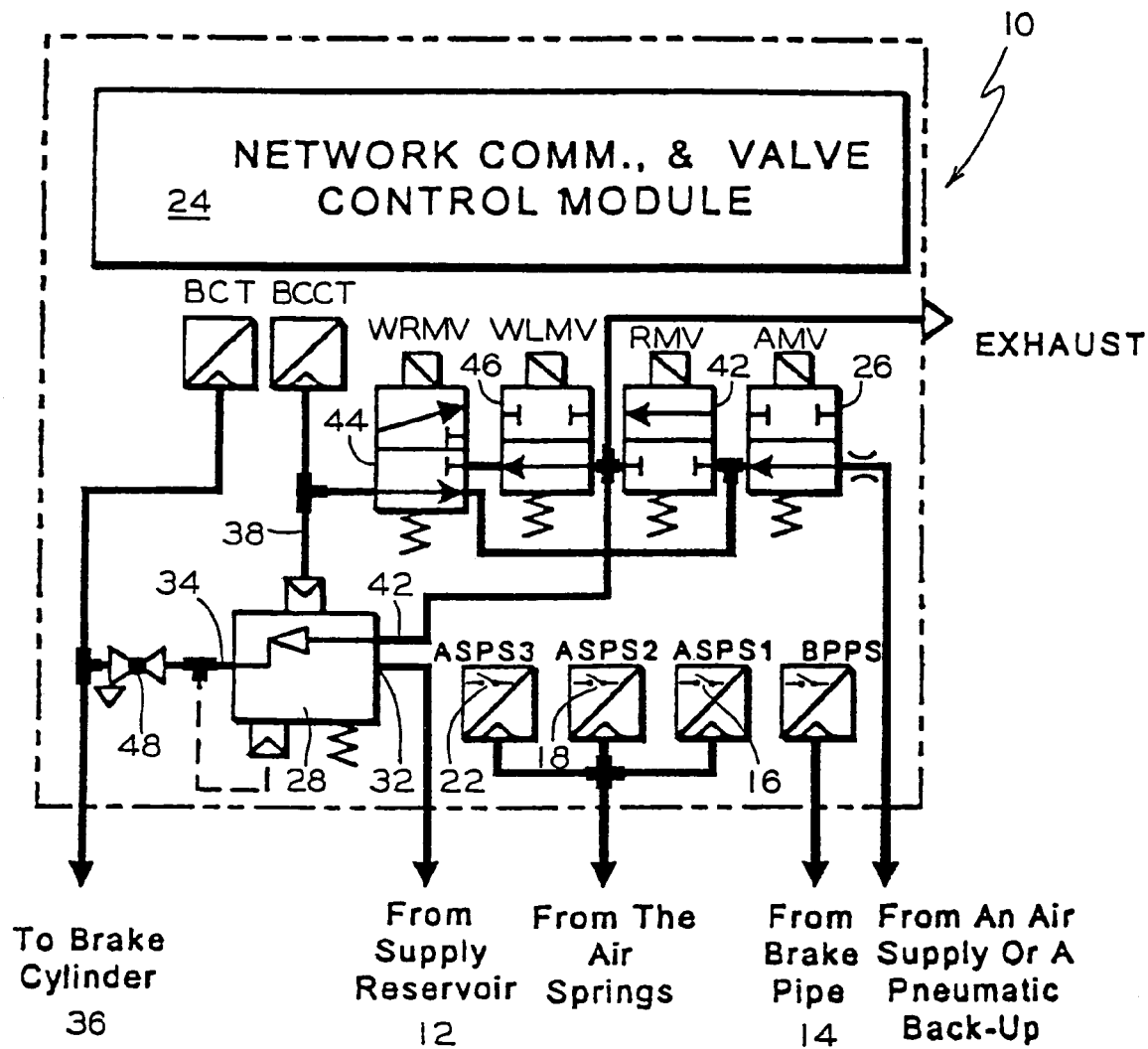
FIG. 1 is a piping schematic of an electro-pneumatic brake control device, which uses a presently preferred embodiment of the digital multi-point electronic load weigh system of the invention.

Prior to proceeding with the more detailed description of the present invention it should be noted that, for the sake of clarity, identical components, which have identical functions have been designated by identical reference numerals throughout the drawing Figures.

Figure 2:
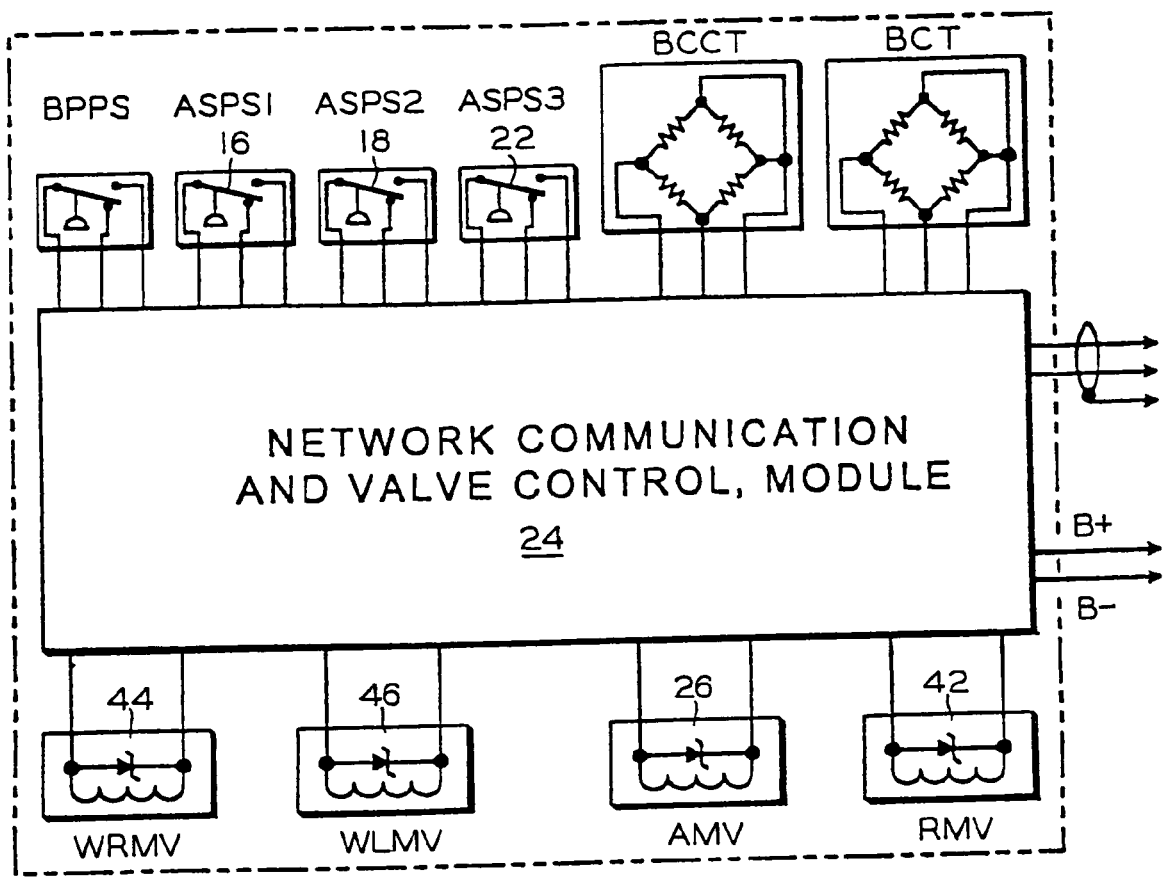
FIG. 2 is an electrical schematic of an electro-pneumatic brake control device, which uses a presently preferred embodiment of the digital multi-point electronic load weigh system of the present invention.

Reference is now made to FIGS. 1 and 2. Illustrated therein is a presently preferred embodiment of a digital multi-point electronic load weigh system, generally designated 10, of a rail vehicle. The digital multi-point electronic load weigh system 10 for a rail vehicle comprises a source of fluid pressure. The source of fluid pressure is either the main reservoir 12 of the brake pipe 14. There are three air spring pressure switches, ASPS1, ASPS2, and ASPS3, designated 16, 18, and 22, respectively for receiving a plurality of air spring pressure limits ranging from about 60 psi to about 90 psi. Also included is a brake cylinder control device for receiving the air spring pressure limits used for determining an emergency braking condition exists, converting the pressure into an electronic signal, and generating a brake limit condition signal. There are eight possible patterns for determining an emergency braking condition, four defining a pressure level limitation, and four that indicate a fault in either the air pressure switches 16, 18, and 22, or their interfaces. Referring now to Table 1 to indicate the eight possible patterns:

TABLE 1

| ASPS3 | ASPS2 | ASPS1 | Brake Cylinder Pressure Limit or Fault Response |
|---|---|---|---|
| 0 | 0 | 0 | Limit Brake Cylinder Pressure to 49.0 psi |
| 0 | o | 1 | Limit Brake Cylinder Pressure to 52.5 psi |
| 0 | 1 | 0 | Fault ASPS2, or ASPS1; ASP1 Most Probable - Limit Brake Cylinder Pressure to 55.8 psi |
| 0 | 1 | 1 | Limit Brake Cylinder Pressure to 55.8 psi |
| 1 | 0 | 0 | Fault ASPS3, ASPS2, or ASPS1; ASPS3 Most Probable - Limit Brake Cylinder Pressure to 49.0 psi |
| 1 | 0 | 1 | Fault ASPS3, ASPS2, or ASPS1; ASPS2 Most Probable - Limit Brake Cylinder Pressure to 58.9 psi |
| 1 | 1 | 0 | Fault ASPS3, ASPS2, or ASPS1; ASPS1 Most Probable - Limit Brake Cylinder Pressure to 55.8 psi |
| 1 | 1 | 1 | Limit Brake Cylinder Pressure to 58.9 psi |

Also included is a network communication and valve control means 24 for receiving the brake limit condition signal, for communicating a voltage signal to a common leg of the air spring pressure switches 16, 18, and 22 and for generating an energization signal. Connected to the network communication and valve control means 24 is an application valve 26 for receiving the energization signal and for communicating a brake control pressure signal when energized, wherein the network communication and valve control means 24 is a neuron style communication control processor.

Also included is a relay valve 28 for receiving the brake control pressure signal. Such relay valve 28 has a supply port 32 connected to a main reservoir 12, an output port 34 connected to line 36 leading to a brake cylinder of a truck (not shown), via either a manually or electronically operated brake cutout valve 48 for maintenance purposes, a control port 38 for communicating the source of fluid pressure, and an exhaust port 42 from which to vent such brake cylinder.

Furthermore, the relay valve 28 provides, in response to the brake control pressure at the control port 38, a corresponding pressure to such brake cylinder thereby causing an application of such brakes on such truck.

Also included is a release valve 42 for exhausting pressure received from control port 38 of the relay valve 28 when the release valve 42 is open. The present invention further includes a brake control means for converting pressure received from a load sensing system to a feedback signal indicative of a load borne by such truck, and a means for granting a load compensation means exclusive control over application and release valves, 26 and 42. Such granting means includes a wheel slip release relay 44 that when energized closes a set of normally open contacts and opens a set of normally closed contacts, each of these normally open contacts when closed completes one of a plurality of conductive paths that electrically interconnects such controller unit with the application and release valves, 26 and 42, each of the normally closed contacts when failing to close while the wheel slip release relay 44 is de-energized signifies that a corresponding one of the normally open contacts mechanically associated therewith has failed to open.

The granting means responds to an indication of an emergency by disconnecting such controller unit from the application and release valves, 26 and 42, thereby giving the load compensation means exclusive control of the application and release valves, 26 and 42, whereby the load compensation means compensates for such load borne by such truck during emergency braking, and the granting means responds to an indication of a non-emergency by connecting such controller unit to the application and release valves, 26 and 42, by which such service braking on such truck is normally controlled with the load compensation means still enabled to compensate for such load borne by such truck during such service braking. The granting means further includes a wheel slip lap relay 46 for interrupting a connection between the release valve 42 and the wheel slip release relay 44 to energize the wheel slip release relay 44, such controller unit by energizing the wheel slip release relay 44 during an emergency permits such controller unit to control the application and release valves, 26 and 42, for at least a purpose of controlling slipping of such wheels on such truck.

Figure 3A:
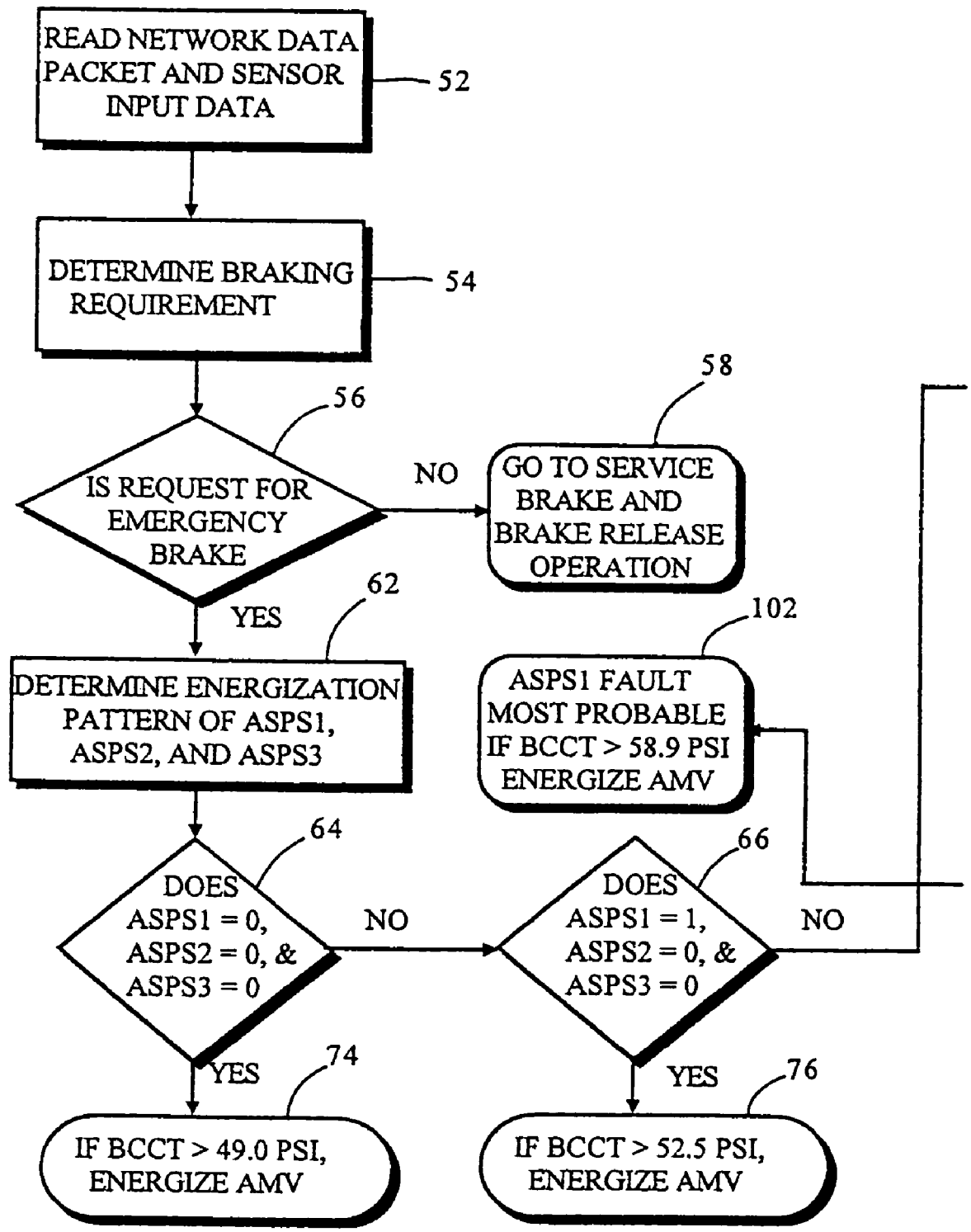
FIGS. 3a and 3b are a flow chart of a process for performing a load function used by the digital multi-point electronic load weigh system of the present invention.
Figure 3B:
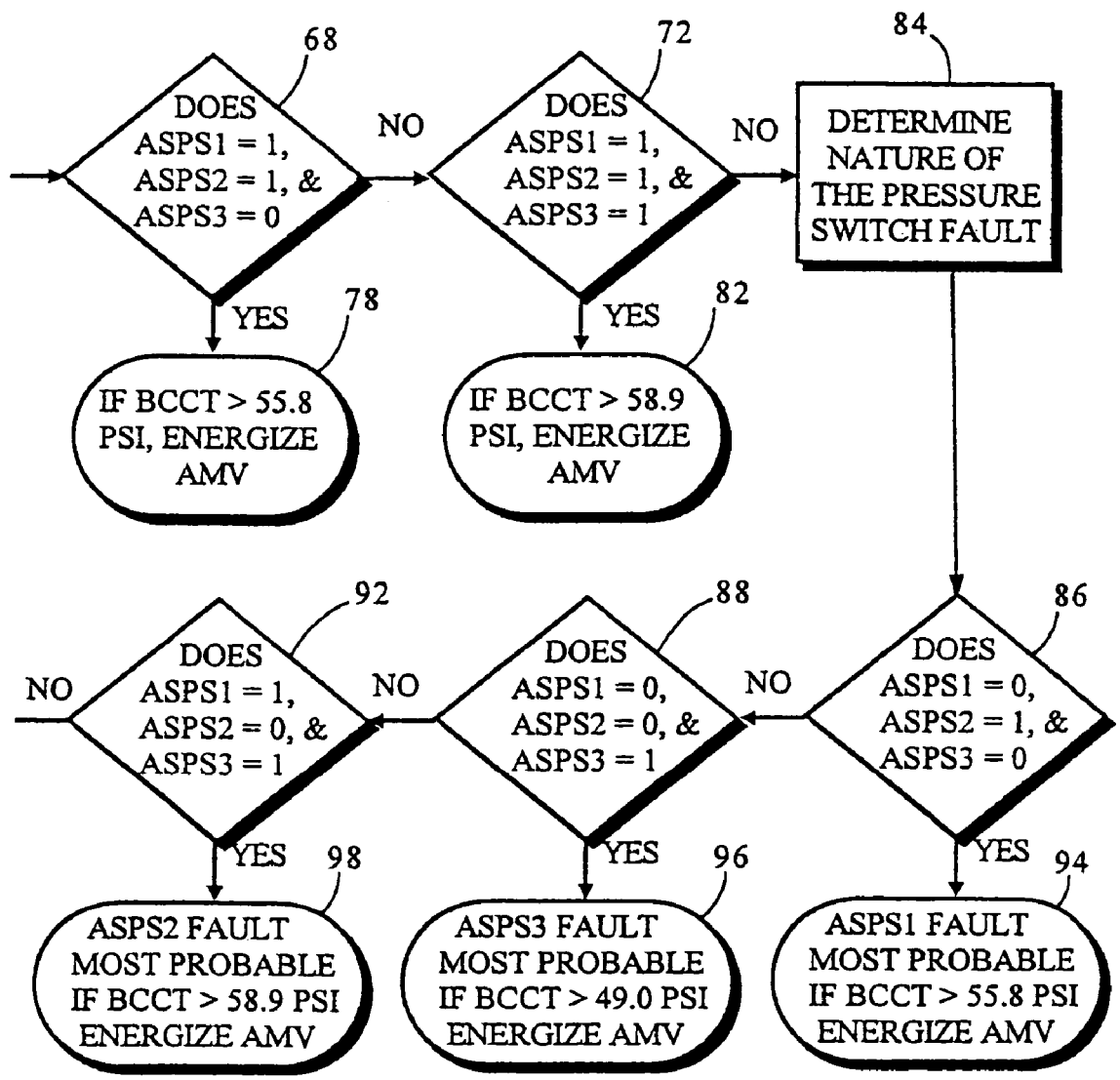

Reference is now made to FIG. 3. Illustrated therein is a flow chart of the presently preferred embodiment of a digital multi-point electronic load weigh system of a rail vehicle. The method in this embodiment of the digital multi-point electronic load weigh system for a rail vehicle includes performing a brake load weigh function on a truck of a rail vehicle. The method includes the steps of reading a network data packet from a sensor input means 52, determining a braking requirement 54, determining if the braking requirement is an emergency brake condition 56 and generating either a yes signal or no signal indicative of the emergency brake condition. It also includes communicating the no signal to a service brake and brake release means 58, and the yes signal to a means to determine an energization pattern 62.

The means to determine an energization pattern 62 determines the energization pattern by performing a first lookup, and generating either a first yes signal or a first no signal in response to the first lookup function. It also communicates the present state of the predetermined air spring pressure switches 64, 66, 68, and 72 to the brake cylinder control pressure verification means 74, 76, 78, and 82 and the first no signal to a means to determine a pressure switch fault 84. The predetermined air spring pressure switches 64, 66, 68, and 72 range from about 49 psi, about 52.5 psi, about 55.8 psi, and about 58.9 psi, respectively. Upon determining the energization pattern an application magnet valve (not shown) is energized. The means to determine a pressure switch fault 84 determines the nature of a pressure switch fault by performing a second lookup function and generating either a second yes signal or a second no signal in response to the second lookup function. It is also responsible for communicating the present state of the predetermined air spring pressure switches 86, 88, and 92 by communicating the second yes signal to the brake cylinder control pressure verification means 94, 96, and 98, and the second no signal to a brake cylinder control means 102. The predetermined air spring pressure switches 94, 96, and 98 range from about 49.0 psi, about 55.8 psi, and about 58.9 psi, respectively. Upon verifying a fault condition exists an application magnet valve (not shown) is energized.

While both the presently preferred and a number of alternative embodiments of the present invention have been described in detail above it should be understood that various other adaptations and modifications of the present invention can be envisioned by those persons who are skilled in the relevant art without departing from either the spirit of the invention or the scope of the appended claims.

We claim:

1. A method for performing a brake load weigh function on a truck of a rail vehicle, comprising the steps of:
   a) reading a network data packet from a sensor input means;
   b) determining a braking requirement;
   c) determining if said braking requirement is an emergency brake condition;
   d) generating at least one of a yes signal and a no signal indicative of said emergency brake condition;
   e) communicating said no signal to at least one of a service brake and brake release means, and said yes signal to a means to determine an energization pattern; and
   f) determining an energization pattern from said means to determine energization pattern,
   wherein step (f) includes the steps of:
   a) performing a first lookup, and generating at least one of a first yes signal and a first no signal in response to said first lookup function;
   b) verifying a present state of a predetermined plurality of air spring pressure switches;
   c) communicating at least one of said first yes signal to a first plurality of brake cylinder control pressure verification means, and said first no signal to a means to determine a pressure switch fault;
   d) verifying a first plurality of predetermined pressures; and
   e) energizing an application valve when said predetermined pressure is verified.

2. A method for performing a brake load weigh function on a truck of a rail vehicle, according to claim 1, wherein step (c) includes the steps of:
   a) performing a second lookup function and generating at least one of a second yes signal and a second no signal in response to said second lookup function;
   b) verifying said present state of said predetermined plurality of air spring pressure;
   c) communicating said second yes signal to a second plurality of brake cylinder control pressure verification means, and said no signal to said brake cylinder control means;
   d) verifying a second plurality of predetermined pressures, and a predetermined fault condition; and
   e) energizing said application valve when said predetermined fault condition is verified.

3. A method for performing a brake load weigh function on a truck of a rail vehicle, according to claim 2, wherein said second plurality of brake cylinder control pressure verification means is at least two.

4. A method for performing a brake load weigh function on a truck of a rail vehicle, according to claim 3, wherein said second plurality of brake cylinder control pressure verification means is three.

5. A method for performing a brake load weigh function on a truck of a rail vehicle, according to claim 2, wherein said second plurality of predetermined pressures is at least two.

6. A method for performing a brake load weigh function on a truck of a rail vehicle, according to claim 5, wherein said second plurality of predetermined pressures is three.

7. A method for performing a brake load weigh function on a truck of a rail vehicle, according to claim 6, wherein a first predetermined pressure of said second plurality of predetermined pressures is about 49.0 psi, wherein a second predetermined pressure of said second plurality of predetermined pressures is about 55.8 psi, and wherein a third predetermined pressure of said second plurality of predetermined pressures is about 58.9 psi.

8. A method for performing a brake load weigh function on a truck of a rail vehicle, according to claim 1, wherein said first plurality of brake cylinder control pressure verification means is at least two.

9. A method for performing a brake load weigh function on a truck of a rail vehicle, according to claim 8, wherein said first plurality of brake cylinder control pressure verification means is four.

10. A method for performing a brake load weigh function on a truck of a rail vehicle, according to claim 1, wherein said first plurality of predetermined pressures is at least two.

11. A method for performing a brake load weigh function on a truck of a rail vehicle, according to claim 10, wherein said first plurality of predetermined pressures is four.

12. A method for performing a brake load weigh function on a truck of a rail vehicle, according to claim 11, wherein a first predetermined pressure of said first plurality of predetermined pressures is about 49 psi, wherein a second predetermined pressure of said first plurality of predetermined pressures 52.5 psi, wherein a third predetermined pressure of said first plurality of predetermined pressures is about 55.8 psi, and wherein a fourth predetermined pressure of said first plurality of predetermined pressures is about 58.9 psi.

* * * * *